US008401683B2

(12) United States Patent
Maxwell et al.

(10) Patent No.: US 8,401,683 B2
(45) Date of Patent: Mar. 19, 2013

(54) AUDIO ONSET DETECTION

(75) Inventors: Cynthia Maxwell, Menlo Park, CA (US); Frank Martin Ludwig Gunter Baumgarte, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 665 days.

(21) Appl. No.: 12/551,389

(22) Filed: Aug. 31, 2009

(65) Prior Publication Data

US 2011/0054648 A1 Mar. 3, 2011

(51) Int. Cl.
*G06F 17/00* (2006.01)

(52) U.S. Cl. ........................................................ 700/94

(58) Field of Classification Search .................... 700/94; 704/500–504; 84/609, 612, 636
See application file for complete search history.

(56) References Cited

U.S. PATENT DOCUMENTS

| | | | | |
|---|---|---|---|---|
| 6,570,991 | B1 | 5/2003 | Scheirer et al. | |
| 2004/0093354 | A1* | 5/2004 | Xu et al. | 707/104.1 |
| 2006/0196337 | A1* | 9/2006 | Breebart et al. | 84/1 |
| 2008/0072741 | A1* | 3/2008 | Ellis | 84/609 |
| 2008/0201140 | A1* | 8/2008 | Wells et al. | 704/231 |

OTHER PUBLICATIONS

Alexandre Lacoste and Douglas Eck, "Research Article: A Supervised Classification Algorithm for Note Onset Detection," Hindawi Publishing Corporation, EURASIP Journal on Advances in Signal Processing, vol. 2007, Article ID 43745, 13 pages, Department of Computer Science, University of Montreal, QC, Canada H3T 1J4, Copyright 2007, Hindawi Publishing Corporation, 16 pages.

Wan-Chi Lee and C.-C. Jay Kuo, "Musical Onset Detection Based on Adaptive Linear Prediction," Integrated Media Systems Center and Department of Electrical Engineering, University of Southern California, Los Angeles, CA 90089-2564, 4 pages (Publication Date Unknown).

Juan Pablo Bello, Laurent Daudet, Samer Abdallah, Chris Duxbury, Mike Davis, and Mark B. Sandler, A Tutorial on Onset Detection in Musical Signals, IEEE Transactions on Speech and Audio Processing, vol. 13, No. 5, Sep. 2005, Copyright 2005, IEEE, Authorized licensed use limited to: North Carolina State University. Downloaded on Aug. 19, 2009 at 16:02 from IEEE Xplore, 13 pages.

V. Hohmann, "Frequency Analysis and Synthesis Using a Gammatone Filterback," ACTA Acustica United with Acustica, vol. 88 (2002) 433-442, Technical and Applied Papers, Medizinische Physik, Universitat Oldenburg, D-26111, Oldenburg, Germany, Copyright S. Hirzel Verlag, EAA, 10 pages.

* cited by examiner

*Primary Examiner* — Andrew C Flanders
(74) *Attorney, Agent, or Firm* — Blakely, Sokoloff, Taylor & Zafman LLP

(57) ABSTRACT

Among other things, techniques and systems are disclosed for detecting onsets. On a device, an audio signal is pre-processed in temporal domain. The pre-processed audio signal is smoothed on the device. A predetermined quantity of peaks is selectively identified in the pre-processed and smoothed audio signal based on a size of a sample window applied to the pre-processed and smoothed audio signal.

19 Claims, 8 Drawing Sheets

AUDIO ONSET DETECTION

BACKGROUND

This application relates to digital audio signal processing.

A musical piece can represent an arrangement of different events or notes that generates different beats, pitches, rhythms, timbre, texture, etc. as perceived by the listener. Each note in a musical piece can be described using an audio signal waveform in the temporal domain having an onset, attack, transient and decay. The energy-time waveform of a note includes a transition from low energy to high energy and then back down to low energy. The time point at which the waveform begins the transition from low energy to high energy is called the onset. The attack of the waveform represents the rise time or the time interval during which the waveform transitions from low energy (e.g., the baseline) to high energy (e.g., the peak). The transient of the waveform represents the time period during which the energy quickly rises and then quickly falls just before the slow decay at the end of the waveform.

Detection of musical events in an audio signal can be useful in various applications such as content delivery, digital signal processing (e.g., compression), data storage, etc. To accurately and automatically detect musical events in an audio signal, various factors, such as the presence of noise and reverb, may be considered. Also, detecting a note from a particular instrument in a multi-track recording of multiple instruments can be a complicated and difficult process.

SUMMARY

In one aspect, selectively detecting onsets in an audio signal associated with a musical piece is described. Selectively detecting onsets includes pre-processing, on a device, an audio signal in a temporal domain. The pre-processed audio stream is smoothed on the device. A quantity of peaks in the pre-processed and smoothed audio signal is selectively identified based on a size of a sample window applied to the pre-processed and smoothed audio signal. The peaks represent onsets in the audio signal associated with the musical piece.

Implementations can optionally include one or more of the following features. The identified peaks can be used to trigger an event on the device or a different device. Pre-processing the audio signal in temporal domain can include filtering the audio signal using one or more filters that model a human auditory system in frequency and time resolution to encode human perceptual model. Filtering the audio signal in temporal domain using one or more filters that model the human auditory system in frequency and time resolution can include selectively dividing the audio signal to generate a predetermined quantity of filtered audio signals of different frequency subbands, and summing the generated different frequency subband audio signals. Also, signal rectification can be performed before or after the summing process. Also, smoothing the pre-processed signal can include applying a smoothing filter to the pre-processed signal in a single pass and in a single direction. Selectively identifying the predetermined quantity of peaks in the pre-processed and smoothed audio signal can include identifying peaks in the pre-processed and smoothed audio signal based on the sample window having the predetermined size. One or more of the identified peaks can be eliminated by comparing each identified peak to neighboring peaks in the sample window based on at least one of amplitude or temporal relationship to samples in a neighborhood determined by the sample window. The size of the sample window can be changed to increase or reduce the quantity of peaks identified. A temporally first peak in the pre-processed and smoothed audio signal can be identified, and each identified peak can be compared to neighboring peaks starting with the identified temporally first peak. The peaks in the pre-processed and smoothed audio signal that meet or exceed a peak threshold value can be identified. Those identified peaks that meet or exceed the peak threshold value can be kept even when identified to be eliminated based on the temporal relationship to samples in the neighborhood determined by the sample window. Each identified peak can be compared to a mean value of samples in the sample window to eliminate peaks that are less than or equal to the mean value.

In another aspect, a system for onset detection includes a pre-processing unit to pre-process an audio signal associated with a musical piece in a temporal domain, wherein the pre-processing unit models frequency and time resolution of a human auditory system. The system includes a smoothing filter to smooth the pre-processed audio signal. Also, the system includes a peak detector that includes a variable size sample window to selectively identify a predetermined quantity of peaks in the pre-processed and smoothed audio signal. The peaks represent onsets in the audio signal associated with the musical piece.

Implementations can optionally include one or more of the following features. The identified peaks can be used to trigger an event on the system or a different system. The pre-processing unit can be configured to filter the audio signal including selectively divide the audio signal to generate a predetermined quantity of filtered audio signals of different frequency subbands and sum up the generated different frequency subband audio signals. The pre-processing unit can include a gamma filter bank. The smoothing filter can include a low pass filter. The peak detector can be configured to identify peaks in the pre-processed and smoothed audio signal by applying the variable size sample window throughout the pre-processed and smoothed audio signal. Also, the peak detector can eliminate one or more of the identified peaks by comparing each identified peak to neighboring peaks in the variable size sample window based on at least one of amplitude or temporal relationship to samples in a neighborhood determined by the sample window. The peak detector can identify peaks in the pre-processed and smoothed audio signal that meet or exceed a peak threshold value, and keep the identified peaks that meet or exceed the peak threshold value even when identified to be eliminated based on the temporal relationship to samples in the neighborhood determined by the sample window. The peak detector can be configured to compare each identified peak to a mean value of samples in the sample window to eliminate peaks that are less than or equal to the mean value. The identified peaks can be used to trigger an event on the system or a different system.

In another aspect, a data processing device can include a peak detector to identify one or more transitions from low energy to high energy in an audio signal pre-processed in a temporal domain. The data processing device includes a variable size sample window to selectively identify a predetermined quantity of transitions from low energy to high energy in the temporal domain, wherein each identified transition is associated with a time stamp and strength information. The data processing device includes a user interface to receive user input indicative of the size of the variable size sample window. Also, the data processing device includes a memory to store the time stamp and strength associated with each identified transition from low energy to high energy.

Implementations can optionally include one or more of the following features. The peak detector can be configured to compare each identified transition to a mean value of samples in the variable size sample window to eliminate transitions with energies less than or equal to the mean value.

In another aspect, a computer readable medium embodying instructions, which, when executed by a processor, can cause the processor to perform operations including preprocessing an audio signal in temporal domain to accentuate musically relevant events perceivable by human auditory system. The instructions can cause the processor to selectively identify a predetermined quantity of peaks in the preprocessed audio signal based on a size of a sample window applied to the preprocessed audio signal. Identifying a predetermined quantity of peaks can include comparing each identified peak against a mean value of samples in the sample window, and eliminating peaks that do not exceed the mean value. Also, a time stamp and strength information for each identified peak not eliminated can be generated. Moreover, the generated time stamp and strength information associated with each identified peak not eliminated can be used as a trigger for a computer implemented process.

The techniques, system and apparatus as described in this specification can potentially provide one or more of the following advantages. For example, onset detection in the time domain can provide more accurate onset detection than frequency domain detection techniques. Also, adaptive filtering can be used to preserve onsets having different levels in different portions of the audio signal associated with a musical piece. In addition, the detected onsets can be used as triggers for some other thing or process, such as to start, control, execute, change, or otherwise effectuate an event or process. For example, the detected onset can be used to time warp a particular audio track to be in sync with other audio tracks.

BRIEF DESCRIPTION OF THE DRAWINGS

Like reference symbols and designations in the various drawings indicate like elements.

DETAILED DESCRIPTION

Techniques, apparatus and systems are described for detecting the time points in an audio signal that signify important features or events in a musical context. Such features are called onsets. An onset may be detected in the audio signal as a transition from low energy to high energy. Such energy transition may correlate to musical actions, such as playing a note on a keyboard, striking a drum, or strumming a guitar string. The onset detection described in this specification can include exact representation of a target audio signal that facilitates identification of the onsets and specific peak selection routines developed to accurately and automatically identify musically important events.

Onset detection can be performed in the temporal domain, frequency domain, phase domain, or complex domain. For example, frequency domain features can be used to generate a representative signal to draw-out the temporal onset events. However, such frequency-domain analysis tends to introduce undesired artifacts caused by the transformation from the frequency-domain to the time-domain. Thus, frequency domain onset detection may lead to inaccurate identification of the exact temporal audio frame where the onset occurred from within the spectral frame after transformation into the frequency domain.

The techniques for performing onset detection described in this specification can use filtered temporal signals. Additionally, the techniques described in this specification can be carefully tuned to avoid issues related to over-reporting of onsets, or loss of relevant peaks in the down-sampling process.

Onset Detection in Temporal Domain

Figure 1:
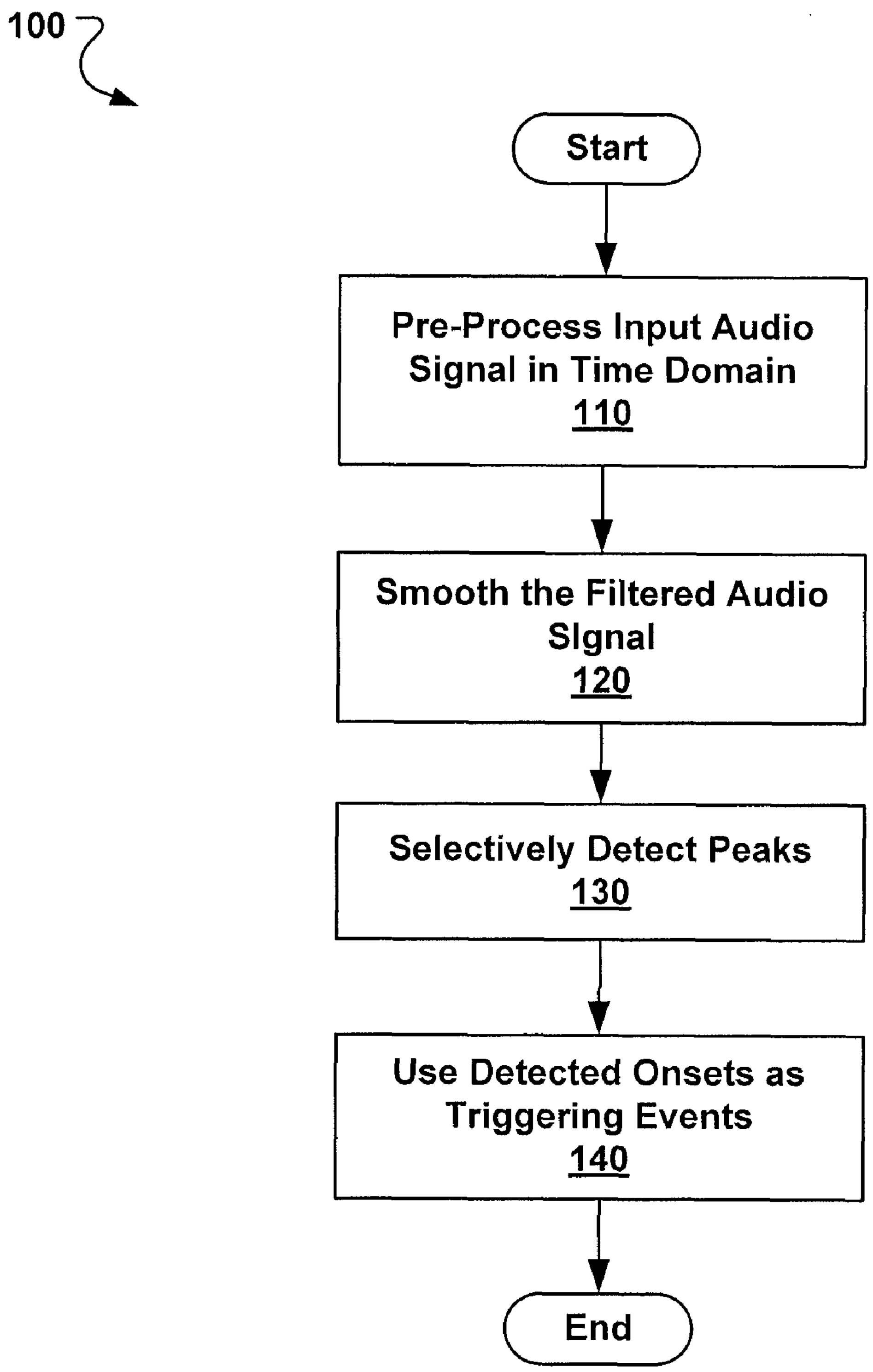
FIG. 1 is a process flow diagram showing an example process for detecting onsets in the temporal domain.

FIG. 1 is a process flow diagram showing an example process for detecting onsets in a target audio signal in the temporal or time domain. The onset detection process 100 can include multiple stages including: preprocessing an incoming audio stream or signal including filtering the signal using a tuned filter such as a temporal gamma bank filter, for example (110); smoothing the pre-processed signal using a smoothing filter, such as a low pass filter (120); and selectively detecting a predetermined quantity of peaks in the pre-processed and smoothed signal (130). The detected onsets can then be used as a trigger to control, execute or activate some other process, device operation, event, etc. in various useful and tangible applications (140). Examples of useful and tangible applications are further described below.

Figure 2:
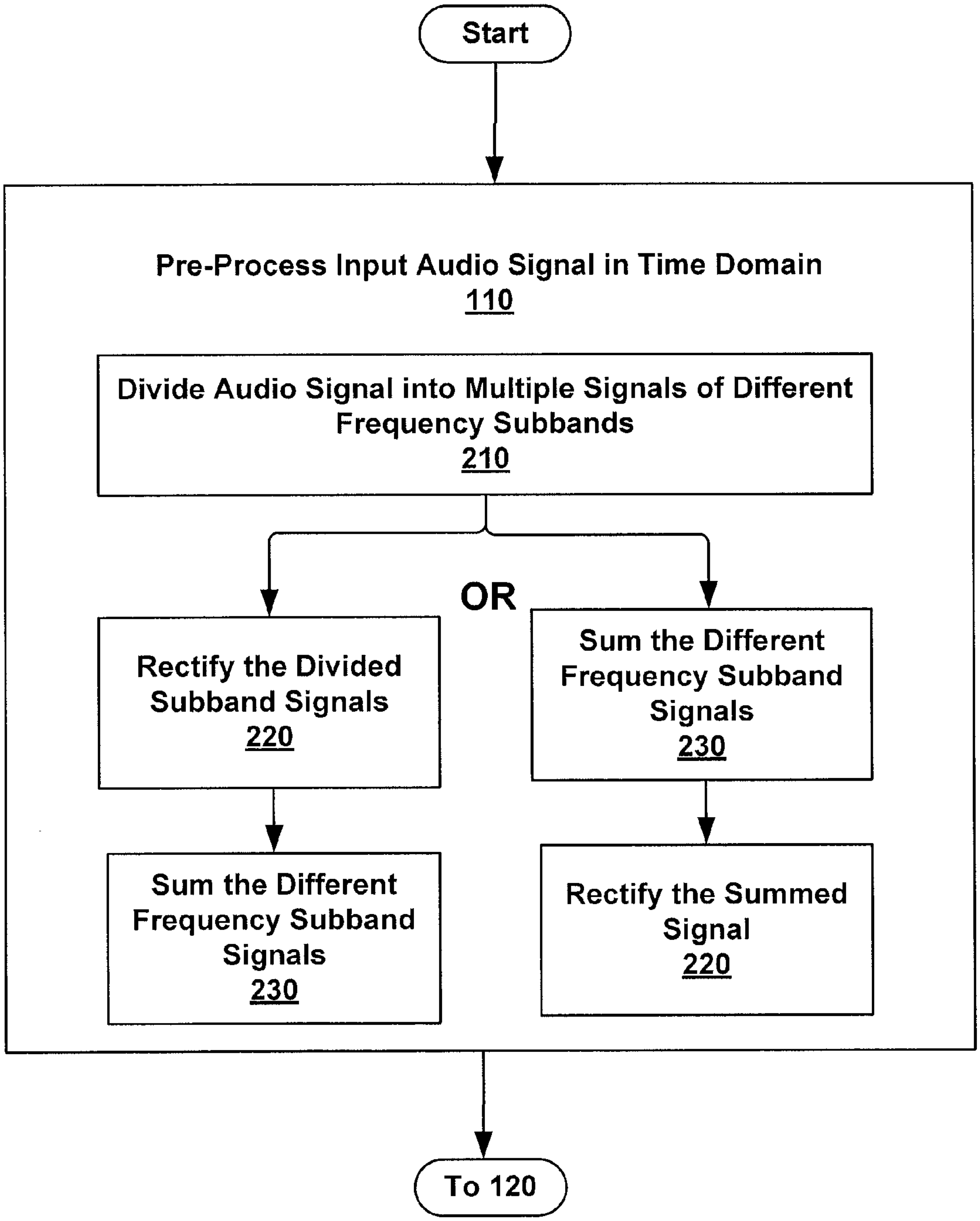
FIG. 2 is a process flow diagram showing an example process for filtering an audio signal.

FIG. 2 is a process flow diagram showing an example process for pre-processing the audio signal. Pre-processing the audio signal conditions the audio signal for onset detection by filtering, rectifying and summing the signal. For example, filtering the signal can include using an auditory filter that mimics the frequency and time resolution of the human auditory system to encode the human perceptual model.

To encode the human perceptual model, pre-processing the audio signal (110) can be performed in real-time by passing the audio samples (e.g., pulse code modulated samples) to a filter tuned to the human auditory system. For example, pre-processing the audio signal (110) using the tuned filter can include filtering the audio signal by dividing the single audio signal into several audio signals of different frequency bands (210). By processing different frequency bands at once, events in various frequency bands can be analyzed simultaneously.

The audio signal filtered by the tuned filter can be rectified (220) and summed (230) into one representative number for each temporal audio frame. For example, after filtering the signal using the tuned filter, such as the filter bank, the signal can be rectified using a half-wave rectifier before passing the pre-processed signal to the subsequent peak detection. The signal rectification can be performed before or after summation of the subband signals. In general, the half-wave rectifier can be implemented as a magnitude function or square function. The rectification can be performed as a part of a human auditory model mimicking the effect of the inner hair cells. Dividing the original audio signal and then summing the individual frequency bands of the original audio signal has the effect of bringing out the subtle events and the events in the low frequency ranges that might otherwise be missed. The result of the summing can be stored in memory for further analysis at a later time or sent to the next stage in the onset detection.

In some implementations, each of these individual frequency bands can be fed into a peak picking algorithm and then the results can be combined at the peak picking stage. Also, the described process can selectively target one frequency band over another. Moreover, the frequency bands can be tuned as desired.

Referring back to FIG. 1, when all of the audio signal of interest has been received and pre-processed using the tuned filter, the pre-processed signal is smoothed using a smoothing filter (120). The smoothing can be performed in a single pass. For example the pre-processed signal can be low-pass filtered from back to front. A discrete-time representation of a simple resistor-capacitor (RC) low-pass filter can be implemented with a smoothing factor between 0 and 1. For example, a simple RC low-pass filter with a smoothing factor of 0.9988668556 can smooth the pre-processed audio signal and prevent multiple similar detections. Filtering in such reverse order can preserve the true onset time and avoid smearing the onset events. To perform the back to front smoothing, the entire pre-processed signal should be stored first.

In some implementations, the smoothing process (e.g., using a low pass filter) can be performed in the front to back order in real time. Such front to back smoothing can be performed using a filter with reverse impulse response. Front to back smoothing does not need have the entire signal first. Also, the peak detection algorithms do not need the entire signal, but only some local window(s). This process can be described as look ahead run forward smoothing.

Figure 3A:
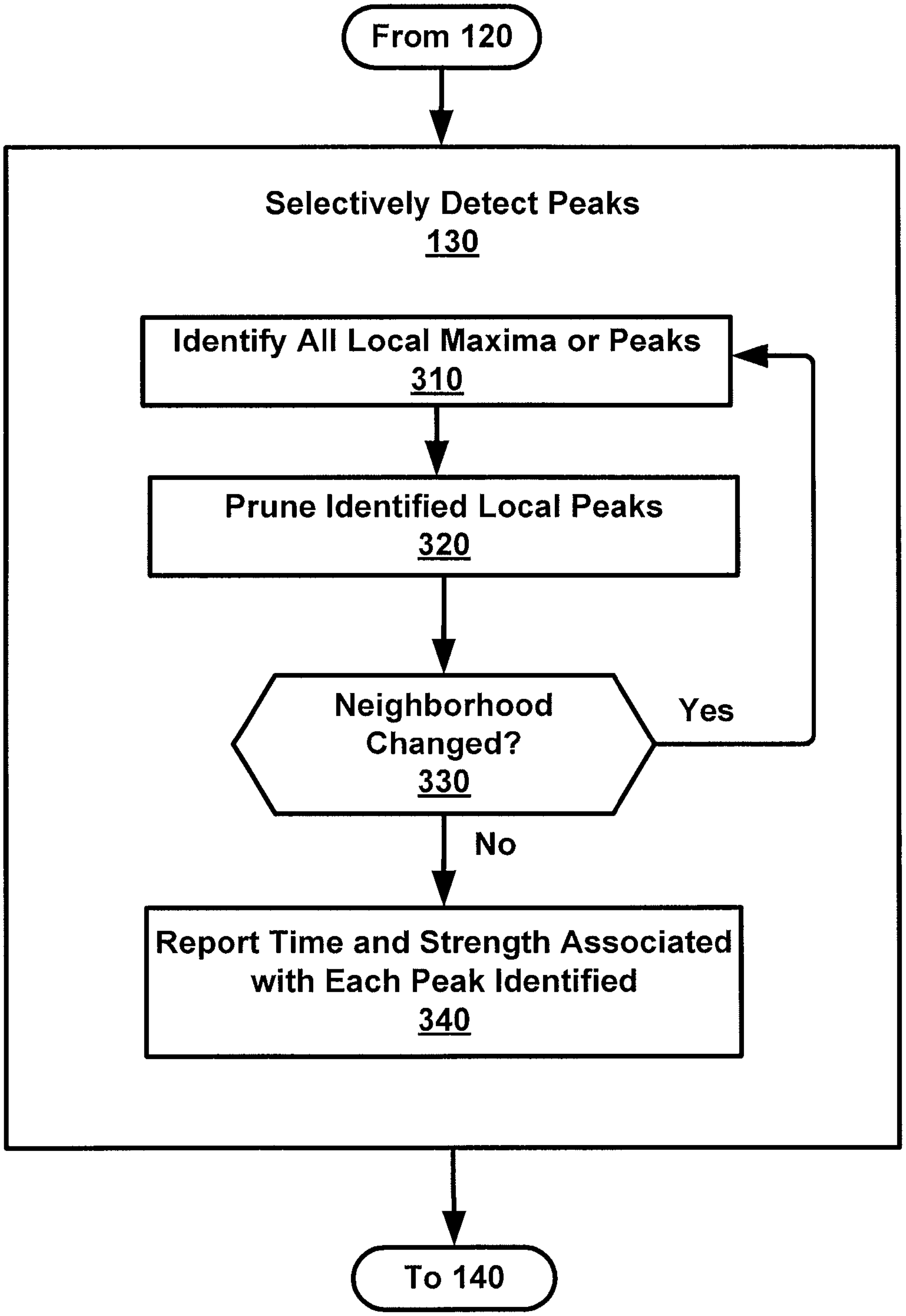
FIGS. 3A and 3B are process flow diagrams showing an example process for selectively detecting peaks in an audio signal.

FIG. 3 is a process flow diagram showing an example process for intelligently selecting peaks in the audio signal. The pre-processed and smoothed audio signal is sent to a peak detector to identify the important peaks in the target audio signal as possible onset events (130). Selective detection of peaks can be performed using a peak picking or detecting algorithm that can include multiple iterative stages.

All local maxima or peaks are identified in the pre-processed and smoothed signal (310). To identify each local maximum or peak in the pre-processed and smoothed audio signal, each local sample is compared to its immediate neighbor to the left and its immediate neighbor to the right. Only those samples that are greater than their immediate neighbors are considered local maxima. Identifying these local maxima can guarantee that any subsequent event is at least a peak in the signal.

Figure 3B:
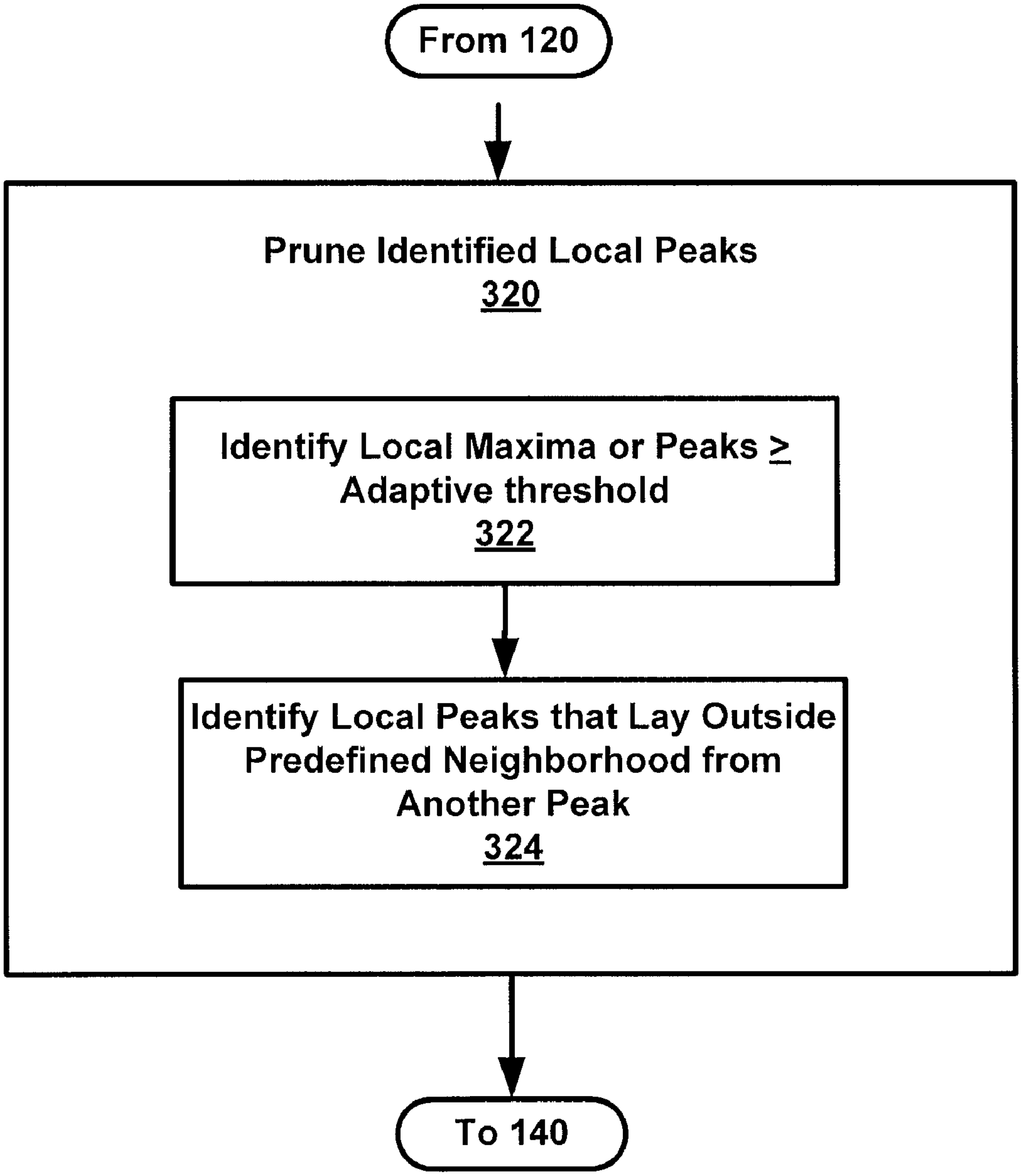

The identified peaks can be pruned to reduce the number of peaks detected (320). FIG. 3B is a process flow diagram showing an example process of pruning the peaks. Pruning the peaks can be performed by identifying all peaks which are greater than or equal to an adaptive threshold (322). This is amplitude pruning. Adaptive threshold is described further below. Then the identified peaks are pruned by determining whether the peaks lay outside of a predefined neighborhood from another peak (324). This is temporal pruning. The neighborhood can be set using a sensitivity relation. The neighborhood can be set prior to the peak peaking analysis. The neighborhood can be changed after analysis, but a change to the neighborhood signals the analyzer to perform the peak picking operation all over again. This is because a change in the neighborhood may have increased the sensitivity and thus an increased number of peaks are now desired. The size of the sample window can be changed to expand a neighborhood of local maxima (330). Each local maximum is compared against neighboring maxima within a neighborhood bounded by the size of the sample window to eliminate some of the local maxima.

Once the detection and pruning process has completed to reduce the quantity of peaks detected, the time and strength information associated with each peak is reported and/or stored for further processing (340). For example, the time and strength information can be used as the trigger for executing, activating or initializing an event, a process, an activity, etc.

The quantity of peaks detected can be based on a sensitivity parameter associated with the size of the sliding sample window. The sensitivity parameter can be selected and input by the user through a user interface. Depending on the value of the sensitivity parameter that a user has chosen (e.g., using a slider graphical user interface), the user can selectively indicate the quantity of peaks to be detected. Higher the sensitivity, narrower or smaller the size of the sample window and higher the quantity of peaks detected.

For example, when the sensitivity is increased to a maximum value, the peak detector can detect essentially all of the local maxima by converging to all of the local maxima. However, the maximum window size can be limited to prevent selection of the entire length of the signal, which can lead to no onsets being detected. For example, where there are no peaks, the neighborhood is set as the length of the signal.

Conversely, when the sensitivity is decreased, the peak detector can detect a lower quantity of local maxima. Because not all of the local maxima are onsets (e.g., some peaks may be noise or reverb, etc.), the sensitivity can be adjusted to obtain the ideal quantity of peak detection. Thus, the user can choose to detect events other than onsets, such as reverb and noise by increasing the sensitivity accordingly.

At any point, the size of the sample window can be changed (e.g., increased) to increase the quantity of neighboring peaks for each identified local peak (330). The sample window can be used as a neighborhood to compare each identified local peak against the adaptive mean in the neighborhood. The sample window can be used to include more of the signal in the mean. For example, if the peak is greater than the mean over a larger area, then that indicates that the peak is an important peak. In this way the neighborhood can be used to prune the peaks based on amplitude. Also, the neighborhood can be used to prune the peaks based on time. For any peak in consideration, the peak can be checked to make sure the peak is not within the neighborhood of a previously detected peak. However, if the peak is considered to be above some strength or amplitude threshold, the peak encroaching on this neighborhood can be considered acceptable. The allowable encroaching distance can be limited so as not to have multiple detections for noisy signals.

Peak pruning can begin with the temporally first peak and prune from there in order of time. This, temporal order can help to preserve the temporal accuracy of the results. Also, in some implementations, pruning can begin with the largest peak in order to ensure that the largest peak is retained in the peak output. Such elimination process has the benefit of selecting the true onsets and to eliminate echoes, reverbs and noise.

However, as described above, there may be some local maxima that are so strong in signal strength that they should not be eliminated even if the peaks encroach upon the neighborhood. Such strong maxima tend to be musically important events. For example, a drum roll can provide a sequence of local maxima that should be retained even if indicated by the neighborhood comparison to be pruned. To provide for such exceptions, a strength threshold can be applied to determine whether each local maximum is considered to be perceptually important.

Hence, those local maxima that meet or exceed the strength threshold, despite their proximity to another peak, are not eliminated. As described above, these peaks are allowed to encroach on this neighborhood. The strength threshold can be chosen by a user input. For example, the user may interface with a graphical user interface (GUI), such as a slider on a display device. Also, the strength threshold can be preset based on the actual audio signal. For example, the strength threshold can be set as a percentage of the mean of the overall audio signal or a percentage of the maximum strength, the amplitude of the largest peak. The percentage value can be some value close to but not equal the mean value of the overall signal or the maximum value. An example range of an acceptable percent value can include those percentages that are greater than 50% but less than 100% of the mean value of the overall signal or the maximum value. In one example, the strength threshold can be set at 75% of maximum amplitude.

Also, as described above, an adaptive threshold is applied to find and preserve onsets of different strengths or amplitudes. Each of the identified local maxima is tested to determine whether the particular local maximum represents a value that is greater than a mean of all of the neighbors in the neighborhood. This testing allows for a detection of peaks that are above the adaptive threshold. The threshold in this application is adaptive because the mean value for different neighborhoods can vary based on the type of musical notes, instruments, etc. captured within each neighborhood.

Thus, adaptive threshold is useful for finding peaks of varying amplitudes within the same audio signal. For example, the peaks in an introduction or breakdown portion can be lower in energy strength compared to the peaks in a very energetic measure of a song. By using an adaptive threshold, the notes in the quiet region (e.g. the intro) can be detected even in the presence of loud drum hits in the later region because the onset detector continues to accumulate some level of importance within a given region.

Moreover, the onset detector can identify the peaks in the lower energy region (such as the intro) for inclusion in the generation of a mean value for the lower energy region and save those peaks in the lower energy region for onset detection. Then, the higher strength peaks that occur later in the audio signal can be identified as being different from the peaks that occurred in the earlier region. By applying an adaptive threshold, the dominant peaks of each portion of the signal are kept and the rest of the peaks are pruned.

As described above, the quantity of peaks returned can be controlled by controlling the sensitivity parameter for the peak detecting algorithm. The more sensitive the parameter, the greater the quantity of peaks returned. In this way, if the user wishes to detect reverb and noise in addition to onsets, the user can do so by applying a very high sensitivity. Otherwise, the sensitivity can be selectively lowered to detect only the prominent peaks as onsets.

After application of the adaptive threshold, the results of the peak detection can be reported (360). The results of the peak detection can include a time-stamp and strength information for each onset detected. For example, when a loud crash occurs, this onset includes high energy or strength so as to distinguish it from something more subtle. Also, the results can be generated in the form of numbers that represent the time and strength information for each onset detected. The results can be reported to the user in real time or saved for later processing and application. Also, the results can be encoded in a file in various formats, such as audio interchange file format (AIFF), etc.

Onset Detection System

Figure 4:
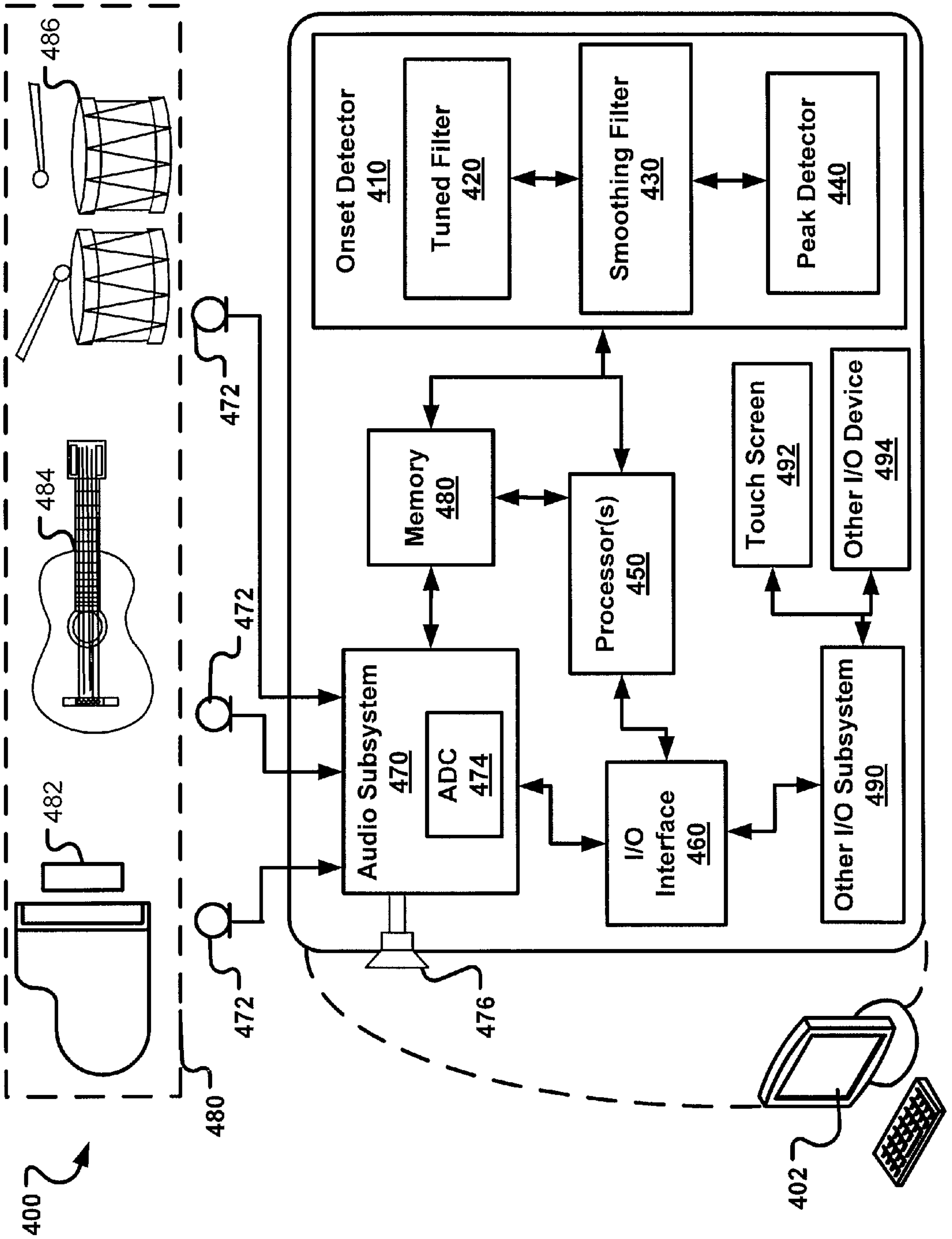
FIG. 4 is a block diagram of a system for detecting onsets in the temporal domain.

FIG. 4 is a block diagram of a system for detecting onsets in a target audio signal in the time domain. The onset detection system 400 can include a data processing system 402 for performing digital signal processing. The data processing system 402 can include one or more computers (e.g., a desktop computer, a laptop), a smartphone, personal digital assistant, etc. The data processing system 402 can include various components, such as a memory 480, one or more data processors, image processors and/or central processing units 450, an input/output (I/O) interface 460, an audio subsystem 470, other I/O subsystem 490 and an onset detector 410. The memory 480, the one or more processors 450 and/or the I/O interface 460 can be separate components or can be integrated in one or more integrated circuits. Various components in the data processing system 400 can be coupled together by one or more communication buses or signal lines.

Sensors, devices, and subsystems can be coupled to the I/O interface 460 to facilitate multiple functionalities. For example, the I/O interface 460 can be coupled to the audio subsystem 470 to receive audio signals. Other I/O subsystems 490 can be coupled to the I/O interface 460 to obtain user input, for example.

The audio subsystem 470 can be coupled to one or more microphones 472 and a speaker 476 to facilitate audio-enabled functions, such as voice recognition, voice replication, digital recording, and telephony functions. For digital recording function, each microphone can be used to receive and record a separate audio track from a separate audio source 480. In some implementations, a single microphone can be used to receive and record a mixed track of multiple audio sources 480.

For example, FIG. 4 shows three different sound sources (or musical instruments) 480, such as a piano 482, guitar 484 and drums 486. A microphone 472 can be provided for each instrument to obtain three separate tracks of audio sounds. To process the received analog audio signals, an analog-to-digital converter (ADC) 474 can be included in the data processing system 402. For example, the audio subsystem 470 can be included in the ADC 474 to perform the analog-to-digital conversion.

The I/O subsystem 490 can include a touch screen controller and/or other input controller(s) for receiving user input. The touch-screen controller can be coupled to a touch screen 492. The touch screen 492 and touch screen controller can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 492. Also, the I/O sub system can be coupled to other I/O devices, such as a keyboard, mouse, etc.

The onset detector 410 can include a pre-processing unit (e.g., a tuned filter) 420, a smoothing filter 430 and a peak picker 440. The onset detector 410 can receive a digitized streaming audio signal from the processor 450, which can receive the digitized streaming audio signal from the audio subsystem 470. Also, the audio signals received through the audio subsystem 470 can be stored in the memory 480. The stored audio signals can be accessed by the onset detector 410.

The occurrence of onsets in the received audio signal can be detected by measuring the sound pressure and energies from the perspective of a physical space. In addition, a person's perception (i.e., what the human ears hear) of the onset can also be incorporated. The pre-processing unit 420 can encode the human perceptual model by tuning a filter empirically based on known measurements of the human auditory system. Thus, the pre-processing unit 420 can be used to preprocess the original audio signal to attenuate or accentuate different parts of the audio signal as desired. For example, different frequency subbands of the original audio signal can be processed and analyzed to detect musically important events in each subband based on the human perceptual model.

The pre-processing unit 420 can be implemented using any filter that mimics the frequency and time resolution of the human auditory system to encode the human perceptual model. One example of a tuned filter 420 is an impulse response filter, such as a gammatone filter bank. The gammatone filter bank can be implemented in the time domain by cascading multiple first-order complex bandpass filters, for example.

When the received audio signal is processed by the gammatone filter bank, the single audio signal is divided into several audio signals of different frequency subbands. This allows for the inclusion of events in various frequency subbands simultaneously. As described above with respect to FIG. 1, the filtered signal is then rectified and summed into one representative number for each temporal audio frame. As described above, the signal can be rectified using a half-wave rectifier before passing the pre-processed signal to the subsequent peak detection. The signal rectification can be performed before or after summation of the subband signals. In general, the half-wave rectifier can be implemented as a magnitude function or square function. The rectification can be performed as a part of a human auditory model mimicking the effect of the inner hair cells.

The gammatone filter bank can be tuned to have certain frequency ranges to 1) capture onsets in noisy background; 2) to alleviate the problems of mixing and mix-down; and 3) synchronize with individual frequency band itself. Tuning of the gammatone filter bank can be performed using a selective switch, a slider or other user selective input.

The smoothing filter 430 receives the pre-processed signal and processes the pre-processed signal to smooth out the signal for noise, etc. The smoothing filter 430 can be implemented using a low pass filter. The amount of smoothing can depend on different factors, such as the quality of the audio signal. A discrete-time implementation of a simple resistor-capacitor (RC) low pass filter can represent an exponentially-weighted moving average with a smoothing factor. For example, a simple RC low pass filter with a smoothing factor of 0.9988668556 can be used as the smoothing filter 430.

The pre-processed and smoothed signal is sent to the peak detector 440 which looks for the important peaks in the pre-processed and smoothed signal and identifies the peaks as possible onset events. The peak detector 440 can be implemented as an algorithm, such as a computer program product embodied on a computer readable medium.

Figure 5:
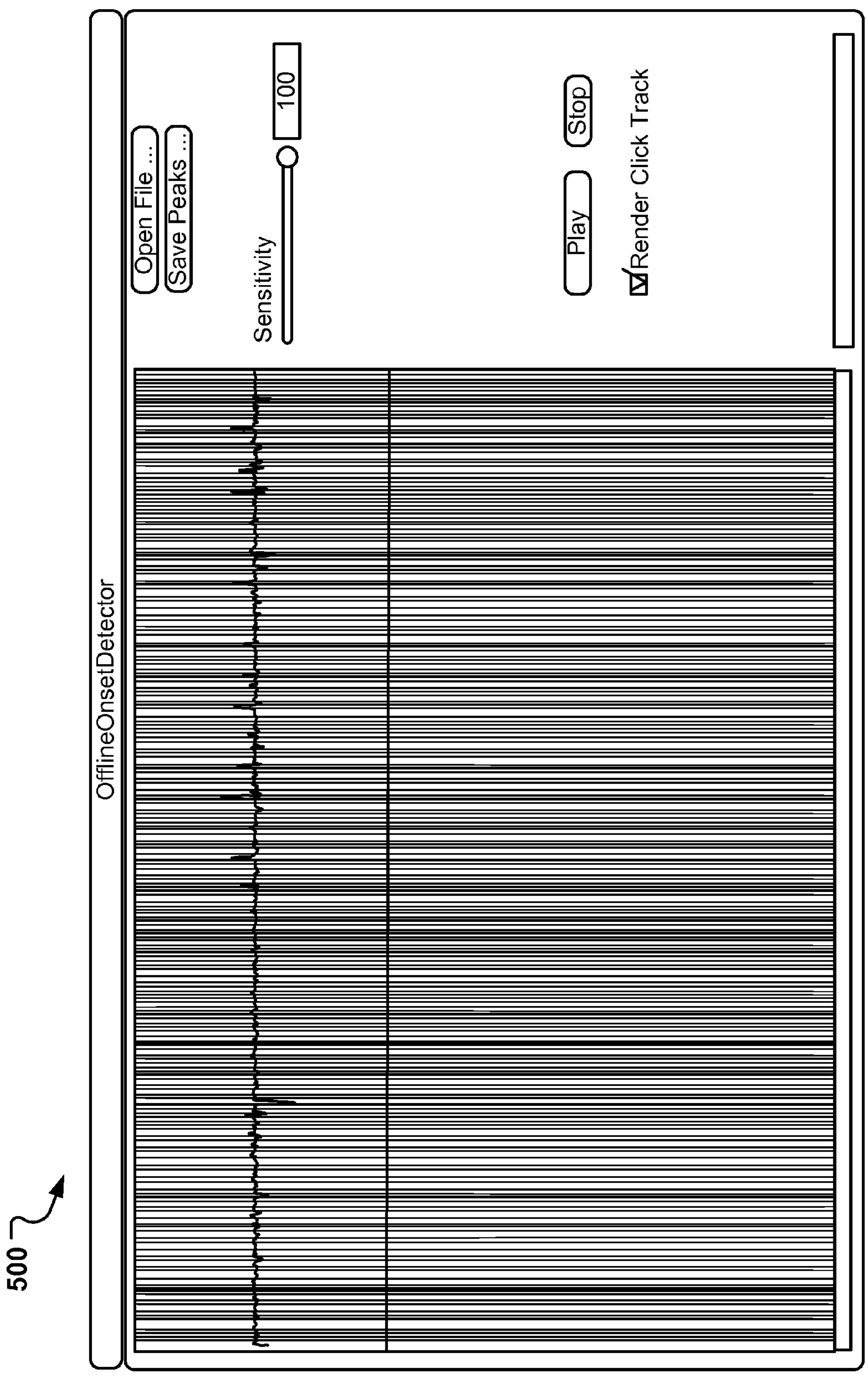
FIG. 5 shows an example output screen that includes a result of peak detection with the sensitivity parameter set at the maximum value (e.g., sensitivity of 100).
Figure 6:
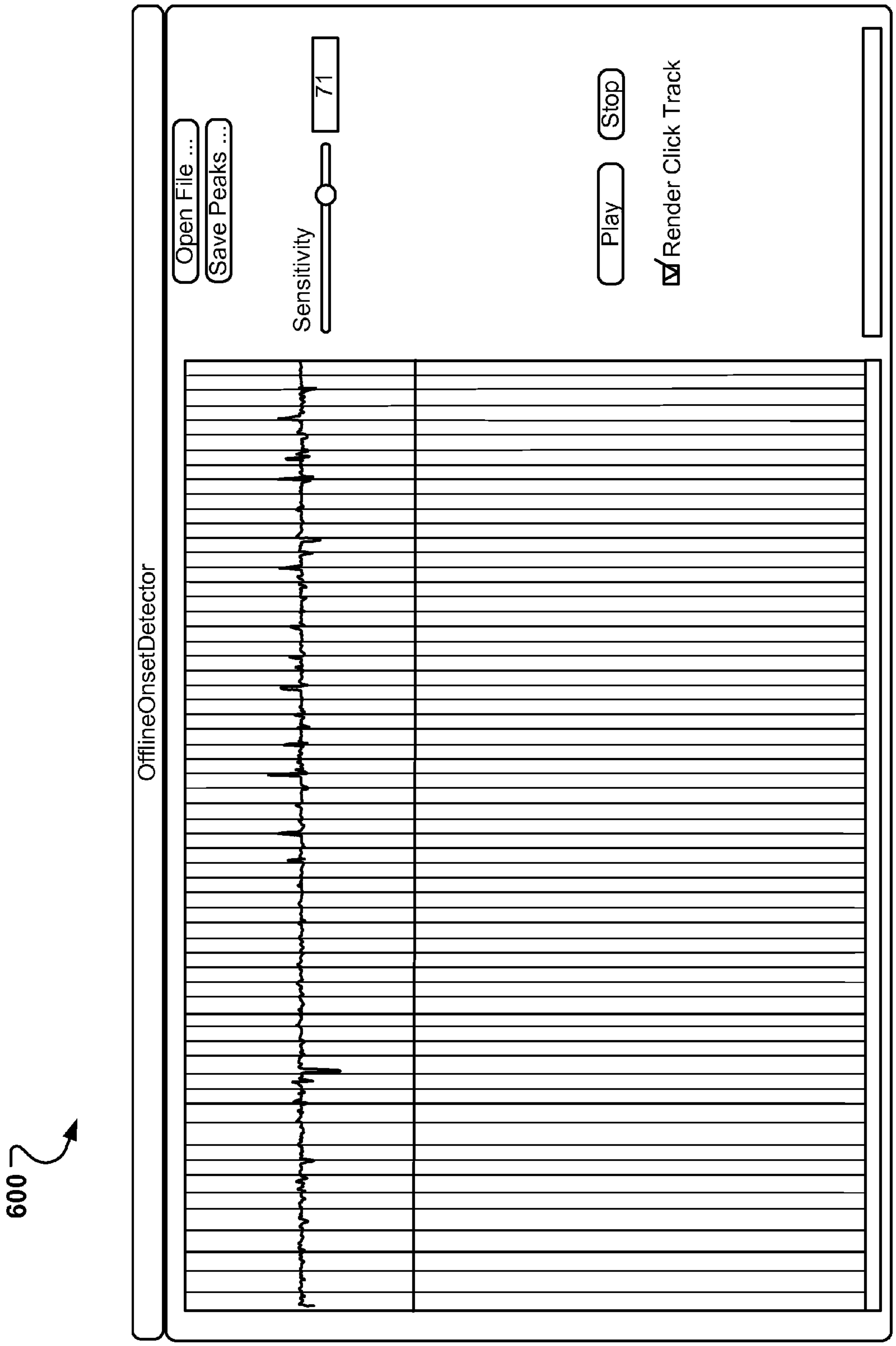
FIG. 6 shows an example output screen that includes a result of peak detection with the sensitivity parameter set at a value lower than the maximum (e.g., sensitivity of 71).
Figure 7:
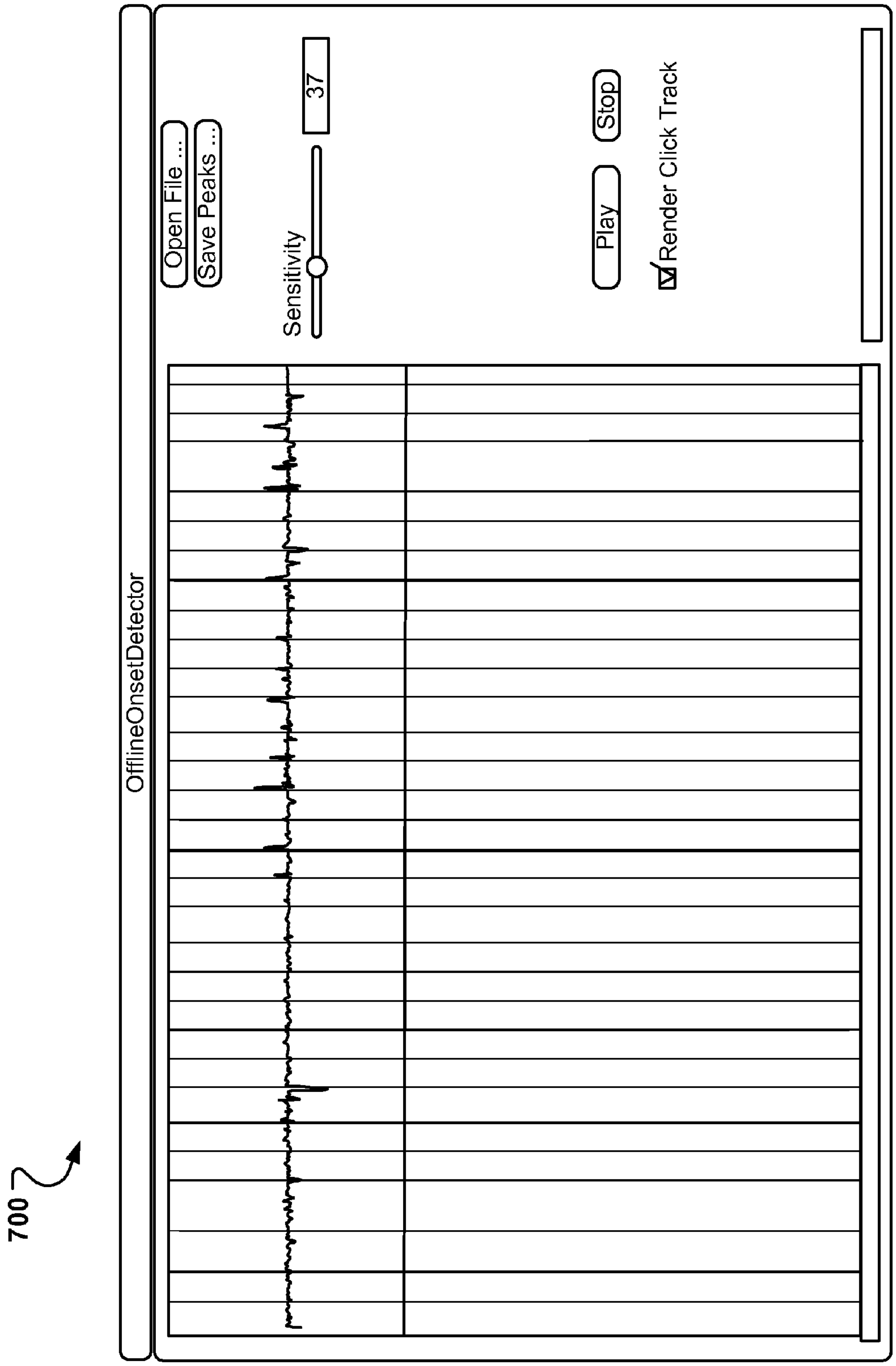
FIG. 7 shows an example output screen that includes a result of peak detection with the sensitivity parameter set at value slower than those shown in FIGS. 5 and 6 (e.g., sensitivity of 37).

FIGS. 5, 6 and 7 are screen shots showing example results 500, 600 and 700 generated from the onset detection. FIGS. 5, 6 and 7 show the same audio signal in time domain but with different sensitivities applied during the onset detection. In all three figures, the vertical lines represent the location (in time) of peaks detected.

For example, the result 500 shown in FIG. 5 includes the result of peak detection with sensitivity set at the maximum value (e.g., 100). Each of the vertical lines represents each local peak or maximum identified. Because of the high sensitivity (e.g., narrow or small sample window), the result converges to all of the local maxima in the neighborhood.

The result 600 shown in FIG. 6 is based on a lowered sensitivity (e.g., 71). Compared to the result shown in FIG. 5, a lower quantity of vertical lines is shown. Thus, a lower quantity of local peaks is detected and some of the peaks detected in FIG. 5 have been pruned or eliminated.

In FIG. 7, the result 700 is based on the sensitivity being further reduced (e.g., 37) compared to FIGS. 5 and 6. The result 700 shows the lowest quantity of vertical lines among FIGS. 5, 6 and 7. Thus, the lowest quantity of local maxima is detected. Output 700 may represent the detection of true onsets and elimination of reverbs and noise.

Moreover, a GUI (e.g., a slider) for receiving user selection of the sensitivity parameter can be implemented as shown in FIGS. 5, 6 and 7. The slider GUI that represents the sensitivity parameter can be mapped to a peak neighborhood. Equation 1 below shows an example mapping function for mapping the sensitivity parameter to the peak neighborhood.

$$\text{neighborhood}=(1-\text{sensitivity})*\text{maximum\_interval}+\text{minimum\_interval} \quad (1)$$

The neighborhood function can be used to reduce the peaks and limit the quantity of peaks detected within that neighborhood. For example, when the sensitivity is high, the neighborhood is small and many if not all of the peaks are detected. When the sensitivity is low, the neighborhood is large and few if any peaks are detected. Varying the sensitivity between the high and the low settings can selectively adjust the total quantity of peaks detected. A maximum interval can be set at a level so as to prevent a state when all of the onsets are eliminated. Also, a minimum interval can be set at a level to prevent reporting too many onsets in a noisy signal.

Examples of Useful Tangible Applications

There are several technologies that could benefit from transcribing an audio signal from a stream of numbers into features that are musically important (e.g., onsets). For example, one could synchronize video transition times to notes played in a song. Similarly, one could synchronize audio effects applied to one track of a song to events occurring in another track. For example, a percussion track can be generated using the detected onsets to gate the amplitude of a vocal track.

In general, the detected onsets can be stored in the memory component 380 and used as a trigger for something else. For example, the detected onsets can be used to synchronize media files (e.g., videos, audios, images, etc.) to the onsets. Also, the detected onsets can be used in retiming of audio (e.g., elastic audio) to compensate for fluctuations in timing. For example, an audio signal of a band may include three tracks, one for each of three instruments. If any of the three instruments are off in timing, the corresponding bad track can be warped to be in sync in time with the rest of the tracks and instruments. Thus, onset detection can be used to identify and preserve the points of high energy because the high energy events are musically important but warp the rest of the audio to change the timing.

Other applications of onsets can include using the detected onsets to control anything else, whether related to the audio signal or not. For example, onsets can be used to control different parameters of the onset detector, such as the filter parameters. Also, the onsets can be used to trigger changes to the color of some object on a video application. Onsets can be used as triggers to synchronize one thing to other things. For example, image transition in a slide show can be synchronized to the detected onsets. In another example, the detected onsets can be used to trigger sample playback. The result can be an automatic accompaniment to any musical track. By adjusting the sensitivity, the accompaniment can be more or less prominent in the mix.

The techniques for implementing the contextual voice commands as described in FIGS. 1-7 may be implemented using one or more computer programs comprising computer executable code stored on a tangible computer readable medium and executing on the data processing device or system. The computer readable medium may include a hard disk drive, a flash memory device, a random access memory device such as DRAM and SDRAM, removable storage medium such as CD-ROM and DVD-ROM, a tape, a floppy disk, a Compact Flash memory card, a secure digital (SD) memory card, or some other storage device. In some implementations, the computer executable code may include multiple portions or modules, with each portion designed to perform a specific function described in connection with FIGS. 1-3. In some implementations, the techniques may be implemented using hardware such as a microprocessor, a microcontroller, an embedded microcontroller with internal memory, or an erasable, programmable read only memory (EPROM) encoding computer executable instructions for performing the techniques described in connection with FIGS. 1-3. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems apparatus and techniques described here can be implemented on a data processing device having a display device (e.g., a CRT (cathode ray tube) or LCD (liquid crystal display) monitor) for displaying information to the user and a positional input device, such as a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method comprising:

selectively detecting an onset in an audio signal associated with a musical piece comprising:

pre-processing, on a device, the audio signal in a temporal domain;

smoothing, on the device, the pre-processed audio signal; and selectively identifying, on the device, a quantity of peaks in the pre-processed and smoothed audio signal based on a size of a sample window applied to the pre-processed and smoothed audio signal, wherein the peaks correspond to individual peaks in the audio signal that represent distinct onsets in the audio signal associated with the musical piece, wherein selectively identifying the quantity of peaks comprises:

identifying peaks in the pre-processed and smoothed audio signal based on the sample window having a predetermined size;

eliminating one or more of the identified peaks by comparing each identified peak to neighboring peaks in a neighborhood associated with the each identified peak based on at least one of amplitude or temporal relationship to the neighboring peaks in the neighborhood associated with the each identified peak, the neighborhood determined by the sample window;

identifying peaks in the pre-processed and smoothed audio signal that meet or exceed a peak strength threshold value;

keeping the identified peaks that meet or exceed the peak strength threshold value even when identified to be eliminated based on the temporal relationship to neighboring peaks in the respective neighborhood; and selecting remaining identified peaks that are not eliminated as local maxima corresponding to the respective neighborhoods associated with the remaining identified peaks.

2. The method of claim 1, further comprising:

using the identified peaks to trigger an event on the device or a different device.

3. The method of claim 1, wherein pre-processing the audio signal in temporal domain comprises:

filtering the audio signal using one or more filters that model a human auditory system in frequency and time resolution to encode human perceptual model.

4. The method of claim 3, wherein filtering the audio signal in temporal domain using one or more filters that model the human auditory system in frequency and time resolution comprises:

selectively dividing the audio signal to generate a predetermined quantity of filtered audio signals of different frequency subbands; and summing the generated different frequency subband audio signals.

5. The method of claim 4, further comprising performing signal rectification before or after the summing process.

6. The method of claim 1, wherein smoothing the pre-processed audio signal comprises:

applying a smoothing filter to the pre-processed audio signal in a single pass and in a single direction.

7. The method of claim 1, further comprising changing the size of the sample window to increase or decrease the quantity of peaks identified.

8. The method of claim 1, further comprising:

identifying a temporally first peak in the pre-processed and smoothed audio signal; and comparing each identified peak to neighboring peaks starting with the identified temporally first peak.

9. The method of claim 1, wherein comparing each of the identified peaks comprises:

comparing each identified peak to a mean value of samples in the sample window to eliminate peaks that are less than or equal to the mean value.

10. A system comprising:

one or more processors;

a pre-processing unit comprising instructions embedded in a non-transitory machine-readable medium for execution by the one or more processors, the instructions configured to cause the one or more processors to perform operations including pre-processing an audio signal associated with a musical piece in a temporal domain, wherein the pre-processing unit models frequency and time resolution of a human auditory system;

a smoothing filter comprising instructions embedded in a non-transitory machine-readable medium for execution by the one or more processors, the instructions configured to cause the one or more processors to perform operations including smoothing the pre-processed audio signal; and a peak detector comprising a variable size sample window and instructions embedded in a non-transitory machine-readable medium for execution by the one or more processors, the instructions configured to cause the one or more processors to perform operations including selectively identifying a predetermined quantity of peaks in the pre-processed and smoothed audio signal, wherein the peaks correspond to individual peaks in the audio signal that represent distinct onsets in the audio signal associated with the musical piece by:

identifying peaks in the pre-processed and smoothed audio signal by applying the variable size sample window throughout the pre-processed and smoothed audio signal;

eliminating one or more of the identified peaks by comparing each identified peak to neighboring peaks in a neighborhood associated with the each identified peak based on at least one of amplitude or temporal relationship to the neighboring peaks in the neighborhood associated with the each identified peak, the neighborhood determined by the sample window;

identifying peaks in the pre-processed and smoothed audio signal that meet or exceed a peak strength threshold value;

keeping the identified peaks that meet or exceed the peak strength threshold value even when identified to be eliminated based on the temporal relationship to neighboring peaks in the respective neighborhood; and selecting the kept identified peaks as local maxima corresponding to the respective neighborhoods.

11. The system of claim 10, wherein the identified peaks are used to trigger an event on the system or a different system.

12. The system of claim 10, wherein the pre-processing unit comprises further instructions that are configured to cause the one or more processors to perform operations including filtering the audio signal comprising:

selectively dividing the audio signal to generate a predetermined quantity of filtered audio signals of different frequency subbands; and summing the generated different frequency subband audio signals.

13. The system of claim 10, wherein the pre-processing unit comprises a gamma filter bank or equivalent perceptual model filter.

14. The system of claim 10, wherein the smoothing filter comprises a low pass filter.

15. The system of claim 10, wherein the peak detector comprises further instructions that are configured to cause the one or more processors to perform operations comprising comparing each identified peak to a mean value of samples in the sample window to eliminate peaks that are less than or equal to the mean value.

16. A data processing device comprising:

a peak detector configured to detect an onset in an audio signal associated with a musical piece by identifying one or more transitions from low energy to high energy in a temporal domain, the peak detector comprising:

a variable size sample window to selectively identify a predetermined quantity of individual transitions from low energy to high energy in the temporal domain, wherein each identified individual transition is associated with a time stamp and strength information, wherein selectively identifying the quantity of transitions comprises:

identifying transitions in the audio signal by applying the variable size sample window throughout the audio signal;

eliminating one or more of the identified transitions by comparing each identified transition to neighboring transitions in a neighborhood associated with the each identified transition based on at least one of amplitude or temporal relationship to the neighboring transitions in the neighborhood associated with the each identified transition, the neighborhood determined by the sample window;

identifying transitions in the audio signal that meet or exceed a transition strength threshold value;

keeping the identified transitions that meet or exceed the transition strength threshold value even when identified to be eliminated based on the temporal relationship to neighboring transitions in the respective neighborhood; and selecting the kept identified transitions as local maxima corresponding to the respective neighborhoods a user interface configured to receive user input for determining the size of the variable size sample window; and a memory configured to store the time stamp and strength associated with each identified individual transition from low energy to high energy.

17. The data processing device of claim 16, wherein the peak detector is further configured to compare each identified individual transition to a mean value of samples in the variable size sample window to eliminate individual transitions with energies less than or equal to the mean value.

18. A non-transitory computer readable medium embodying instructions, which, when executed by a processor, cause the processor to perform operations comprising:

detecting an onset in an audio signal associated with a musical piece comprising:

preprocessing an audio signal in a temporal domain to accentuate musically relevant events perceivable by human auditory system;

selectively identifying a predetermined quantity of peaks in the preprocessed audio signal based on a size of a sample window applied to the preprocessed audio signal, wherein the peaks correspond to individual peaks in the audio signal that represent distinct onsets in the audio signal, the selectively identifying comprising:

identifying peaks in the pre-processed audio signal by applying the variable size sample window throughout the pre-processed audio signal;

eliminating one or more of the identified peaks by comparing each identified peak to neighboring peaks in a neighborhood associated with the each identified peak based on at least one of amplitude or temporal relationship to the neighboring peaks in the neighborhood associated with the each identified peak, the neighborhood determined by the sample window;

identifying peaks in the pre-processed audio signal that meet or exceed a peak strength threshold value;

keeping the identified peaks that meet or exceed the peak strength threshold value even when identified to be eliminated based on the temporal relationship to neighboring peaks in the respective neighborhood; and generating a time stamp and strength information for each identified peak that is not eliminated; and applying the generated time stamp and strength information associated with each identified peak not eliminated as a trigger for a computer implemented process.

19. The method of claim 1, further comprising:

identifying a largest peak in the pre-processed and smoothed audio signal, the largest peak being an individual peak associated with a maximum strength of the audio signal;

determining the peak strength threshold value based on a percentage of an amplitude of the largest peak; and comparing each identified peak in a neighborhood to the peak strength threshold value.

* * * * *